United States Patent [19]

Chung

US005741534A

[11] Patent Number: 5,741,534
[45] Date of Patent: Apr. 21, 1998

[54] PACKAGED FOOD PRODUCT USING PARTITIONED RECEPTACLES WITH REMOVABLE THIN PARTITION WALLS AND METHOD OF MAKING IT

[75] Inventor: Jing-Yau Chung, Houston, Tex.

[73] Assignee: Alice H. Chung, Houston, Tex.; Trustee

[21] Appl. No.: 296,715

[22] Filed: Aug. 26, 1994

[51] Int. Cl.⁶ .................................................. B65D 85/00
[52] U.S. Cl. ...................... 426/120; 426/106; 426/113; 426/114; 426/115; 426/124; 426/393; 426/394; 206/219; 206/222; 53/157; 53/239; 53/474
[58] Field of Search .................................. 426/120, 113, 426/107, 234, 124, 128, 106, 115, 393, 394, 114; 206/219, 222; 53/474, 445, 239, 238, 237, 157, 155, 154

[56] References Cited

U.S. PATENT DOCUMENTS

| | | | |
|---|---|---|---|
| 3,915,532 | 10/1975 | Ashton | 426/124 |
| 4,233,325 | 11/1980 | Slangan et al. | 426/120 |
| 4,348,421 | 9/1982 | Sakakibara et al. | 426/120 |
| 4,517,206 | 5/1985 | Murphy et al. | 426/124 |
| 4,634,003 | 1/1987 | Ueda et al. | 426/120 |
| 4,794,008 | 12/1988 | Schmidt et al. | 426/393 |
| 5,012,971 | 5/1991 | Lozzi et al. | 426/120 |
| 5,312,634 | 5/1994 | Griesbach et al. | 426/120 |
| 5,315,083 | 5/1994 | Green | 426/107 |

Primary Examiner—Lien Tran
Attorney, Agent, or Firm—Mark A. Oathout

[57] ABSTRACT

A new structure for packaging foods and the method of preparing foods using the structure which consists of a food receptacle, its cover and a thin partition layer(s) for separating different food components of an entree during the manufacturing as well as during the heating of an entree. As the result of utilizing the present invention, the said entree can be manufactured more economically, also it can be heated and served easier by the end users without mixing the food components before heating, thus yielding a better quality hot food.

9 Claims, 3 Drawing Sheets

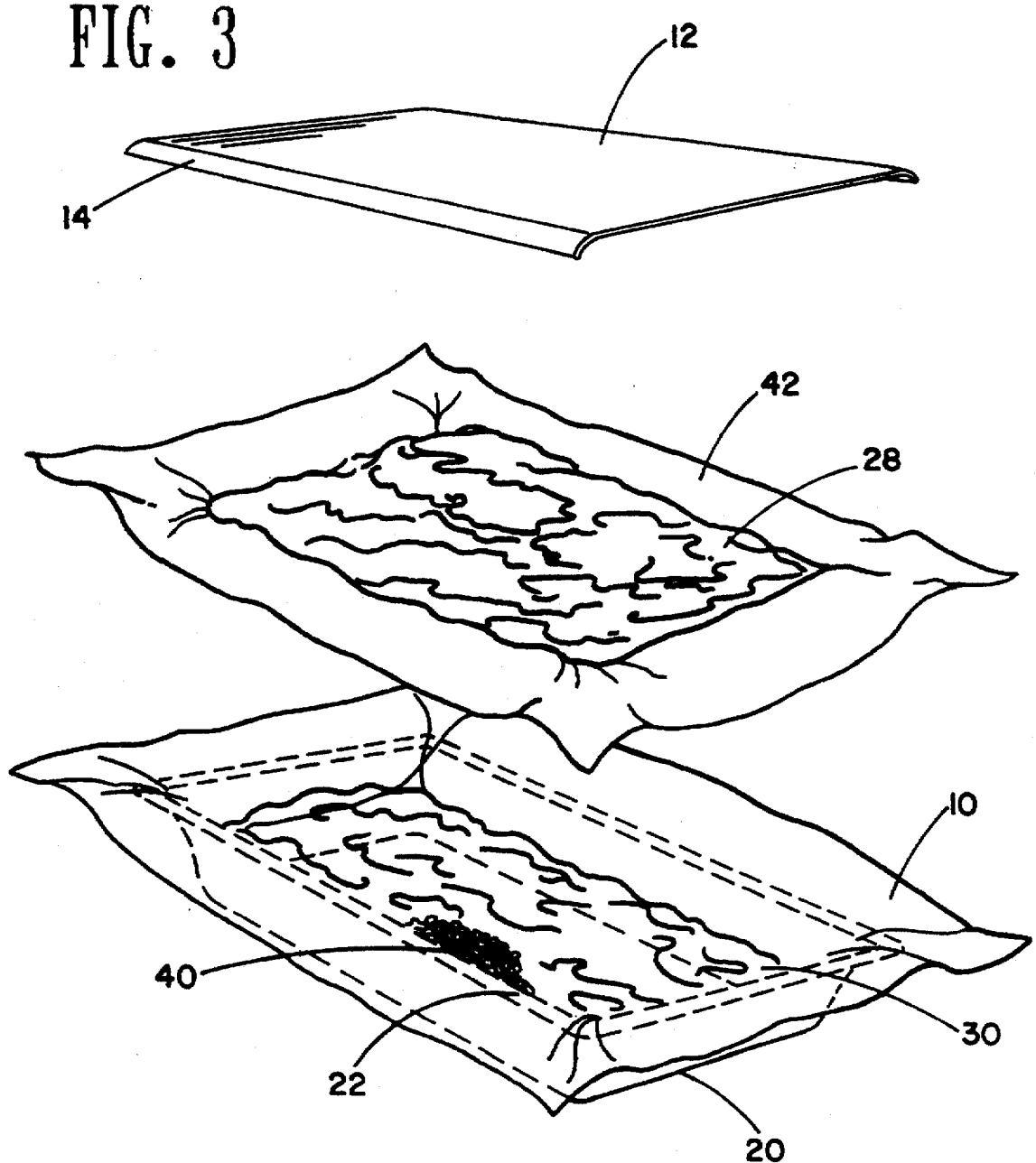

PACKAGED FOOD PRODUCT USING PARTITIONED RECEPTACLES WITH REMOVABLE THIN PARTITION WALLS AND METHOD OF MAKING IT

BACKGROUND OF THE INVENTION

The present invention is related to the manufacturing of frozen foods as well as to the heating of said frozen foods by end users which include cafeterias, hot delis and household consumers.

The steam table has been used widely for displaying prepared foods in cafeterias and hot food delis after said food products are heated by a convection oven or hot steam/water. Many of these foods include more than one component which usually includes a solid, a gravy (or sauce), a thin liquid and a combination of solid and gravy. For simplicity, in the following text, this type of food will be referred to as an "entree" and the individual component will be referred to as a "component". An example of such food item is "Teriyaki Chicken Entree" which consists of fried rice (or steamed rice) as a component and "meat and gravy" as another component. Generally, it is not desirable to pre-mix these two components together prior to heating and serving, rather, the thick "meat and gravy" is placed on top of the rice so that the original texture and "fresh taste" of each component are preserved. So far, to process this entree product in the applicant's food manufacturing plant, the two components are made separately using individual "pouch bags". Experience shows that if the rice and the "meat and gravy" component are pre-mixed, then the entree turns into a thick "gumbo like" mixture which is not acceptable by most users. Other manufacturers even package the different components into different canned packages which are heated separately by the users before combining them for serving.

The above mentioned food preparation may also take place in household kitchens where similar food products are heated and consumed by a family. Typical methods of heating entrees in the household kitchens are microwaving and conventional oven heating. In cafeterias and hot delis, however, hot steam/water cookers, convection ovens and microwave ovens are used to heat the entree products.

From a technical point of view, a problem similar to that mentioned above, namely, "mixing of the different food components", also occurs during the manufacturing of the same entree products. The existing conventional manufacturing method such as the one adopted in the applicant's plant is to manufacture each component separately as if they are different variety foods until they are frozen and free from mixing. The frozen components are then combined to form an entree product. By doing so, it usually requires separate containers or holders(such as pouch bags) to hold each component during each stage of processing which includes "blast freezing" in most cases. It is obvious that this approach is laborious and not cost effective as compared with that using one container for all components, if the mixing of the components were not an issue. In one of the "Teriyaki Chicken" products produced by the applicant's plant for example, the rice component and the gravy component(including meat and vegetable) are made separately and then sent for blast freezing with the rice component in an aluminum tray and the gravy component in a pouch bag. After deep freezing, the "solid gravy" is removed from the pouch bag and is packaged into the aluminum tray which already contains the frozen rice component. The other oriental entrees being manufactured in this manner in the applicant's plant include "Beef and Broccoli". "Sweet and Sour Pork", "Sweet and Sour Chicken", "Moo Goo Gai Pan", "Hunan Beef", "Szechuan Chicken" etc. Other entree items such as pasta based dishes with a sauce chosen from a variety of sauces fall into the same category.

The entrees mentioned above may include more than two components which are all processed separately and then packaged together.

Due to the complexity in the manufacturing procedure as well as the inconvenience in heating and serving by the end users, it is obvious that a more efficient method of preparing the entrees is desirable. This is particularly true for producers of oriental entrees such as the present applicant who has been manufacturing such products for years and has been distributing them to nationwide markets.

SUMMARY OF THE INVENTION

The present invention presents a new apparatus and method of processing the multi-component entrees described above where a single container is used for all entree components during the manufacturing process eliminating the laborious and wasteful multi-unit food processing (for the multi-components) including the relatively expensive blast freezing. Also the same manufacturing method produces an entree product which is free from the problem of "component mixing" experienced by the end users mentioned above. The present invention uses one or more than one thin layer of heat resistant material such as an aluminum foil or a microwaveable and/or ovenable (a loose term commonly used to indicate the heat resisting ability of a material used in the oven) plastic sheet as a barrier to separate the entree components during and after the manufacturing of said entree. The thin layer (or layers) can be cut partially in the middle portion by a knife (or other tools) after the said entree is heated, thus forming a passageway to let the top component (normally the gravy component) flow on top of the bottom component such as the rice component before serving. This eliminates the mixing of the gravy with the rice during heating. It should be noted, the present invention is quite different from any other conventional forms of separating the components such as the ones using separate pouch bags or cans to pack the individual components. The functional and economical advantages included in the present invention as compared with that of the above mentioned conventional methods are:

(a) A much simpler and yet effective way to separate the food components during manufacturing.

(b) A much more economical material is used to separate the components while achieving the same purpose of separation.

(c) The multi-components are assembled prior to blast freezing avoiding errors of mis-assembling wrong components together, which normally requires a complex tracking of each component in the conventional method.

(d) A much more compact package for the entree product is obtained using the present method due to the fact that the components are combined before they are frozen and the gravy is settled closely onto the solid with the thin separating sheet in between them. Whereas, the conventional method requires the assembly of two or more solid frozen components causing wasteful inclusion of air-gaps between the solids.

(e) The simple thin sheet used to separate the components can be used in conjunction with any master container such as a "steam table tray" which is designed to fit the dimensions of a standard size steam table, thus only one type of container is required in the production run. Whereas, in the same case of a "steam table tray", the conventional method requires an additional container(s) such as a pouch bag(s) to blast freeze the component(s) other than that in the "steam table tray". The use of any additional type of container(s) is "not cost effective" with respect to both labor and material costs.

(f) The present invention provides the end users with an easy "fault proof" procedure to assemble the components together after heating and before serving. This is because of the fact that the components are pre-assembled in one container only and the thin-sheet partition is easy to cut open without even touching the hot container by the operator. The conventional method, however, requires more than one container(or pouch bag) to hold the components of a given entree. Often, two oar more types of entrees are heated simultaneously by the cafeteria operator where components may be assembled together by mistake. Moreover, it is more tedious to open up more than one hot container by hand during the assembly of the hot entrees.

BRIEF DESCRIPTION OF THE DRAWINGS

FIG. 3 is a view similar to FIG. 1 showing a second thin partition layer and a third food component.

DETAILED DESCRIPTION OF THE INVENTION

Figure 1:
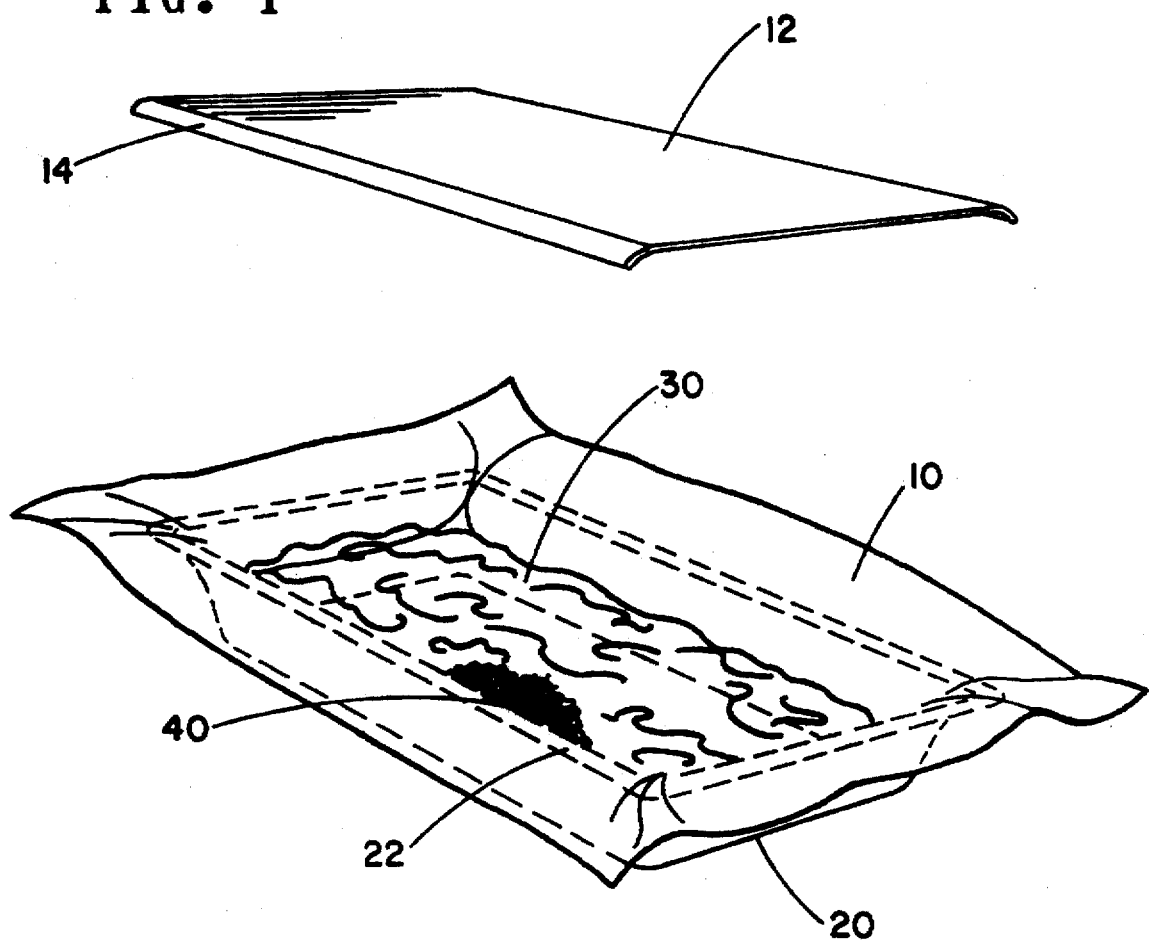
FIG. 1 is a perspective view of the invention.

FIG. 1 shows an example of the present invention comprising a food receptacle 20, a cover 12, a thin partition layer 10 and a two component frozen entree with the first food component 40 (which will be referred to as component A later in the text) and the second food component 30 (which will be referred to as component B later in the text). Receptacle 20 can be a typical "steam table tray" used to package and to deliver a frozen entree to cafeterias and hot delis where the same tray is used to serve the entree on the steam table. The tray is fit directly into the steam table cavity for maintaining a given food temperature after it is heated by the operator using e.g. a convection oven. A typical so called "half size tray" has a dimension of 12 inches long by 10 inches wide, which fits one half of the steam table cavity. In other words, it takes two such trays to fit the cavity. The tray can be made of thick aluminum foil or other microwavable and/or ovenable material and is designed to be used in a convection(or conventional) or a microwave oven at a temperature of up to 480 degrees fahrenheit (F).

Food component 40 which is normally a solid (such as rice, pasta etc.) is placed on the bottom of receptacle 20. A thin partition layer 10 which is made of a thin flexible material (such as an aluminum foil or a plastic sheet) is placed on top of food component 40. Food component 30 which is normally a gravy (or thin liquid) is then placed on top of the thin partition layer 10. The area of the thin partition layer 10 is larger than that of the opening of receptacle 20 such that the thin partition layer 10 is pressed between the edge 22 of the opening and the cover Generally, cover 12 is clamped to receptacle 20 over thin partition layer 10 with its extended edge 14. This covered receptacle is placed directly in the oven for heating.

Figure 2:
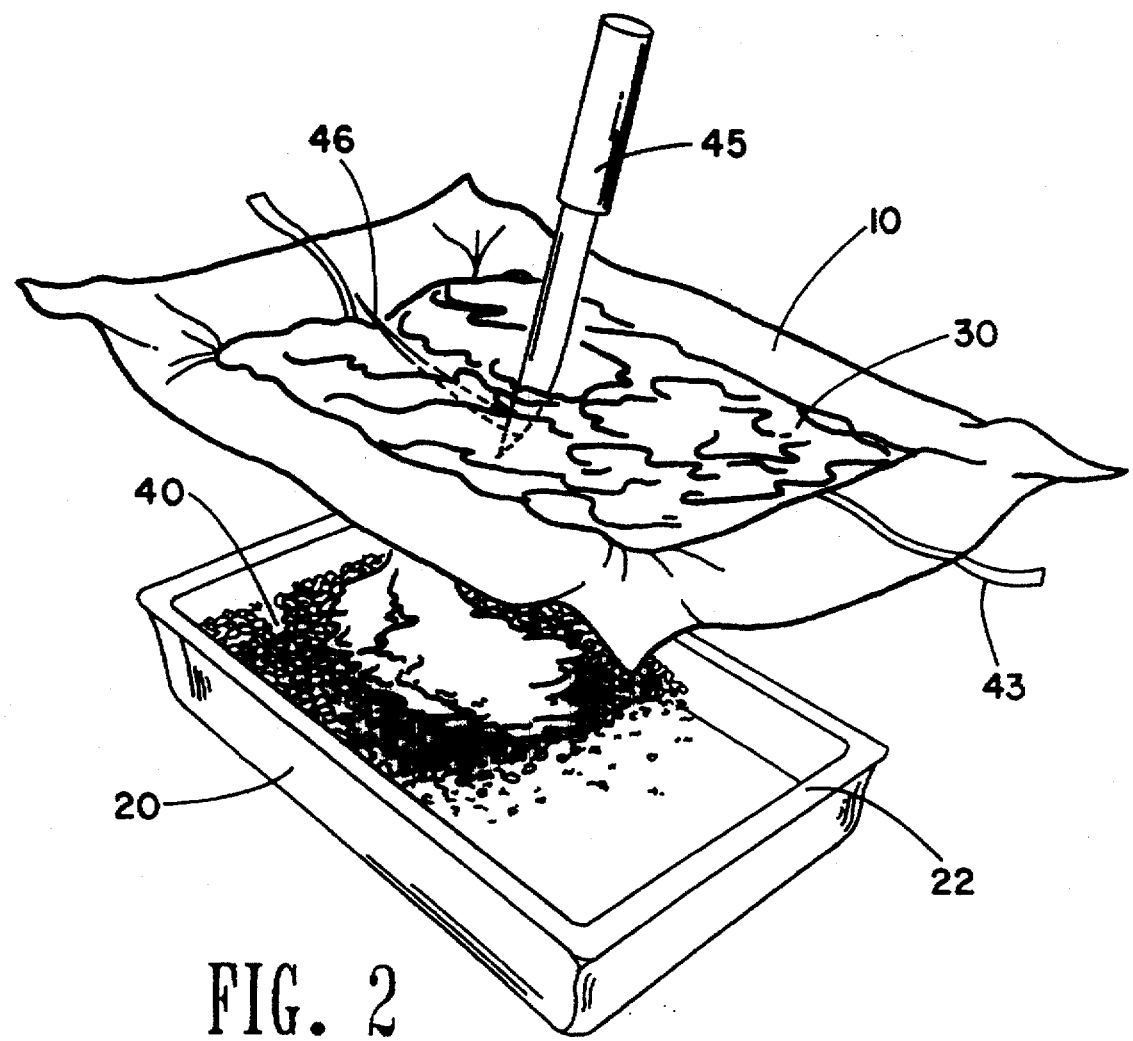
FIG. 2 shows the procedure for assembling the food components by the end users using the present invention.

Referring to FIG. 2, the cover(not shown) is removed after the entree is heated to a desirable temperature. A knife 45 (or other tool such as a fork) can be used to cut the thin partition layer 10 through food component 30, along the center region 46 of the thin layer 10. A "tear strip" 43 (a piece of string, tape or similar device) can be incorporated into the thin partition layer 10 to facilitate cutting of the thin partition layer. The partition layer 10 is then removed slowly while the heated food component 30 (such as a gravy) flows down to food component 40 (such as a fried rice) through the cut opening of layer 10. This results in e.g. a thick gravy staying on top of a fried rice, preserving the distinct definition of each food component and avoiding the component mixing.

As mentioned above, the number of food components are not limited to two only. For example, as shown in FIG. 3, a second partition layer 42 similar to or the same as the partition layer 10 can be placed on top of food component 30. A food component 28 (which may be referred to as food component C) is then placed on top of the second partition layer 42. Additional layers and food components may be added. The food components are normally but not necessarily precooked and frozen. It can be any combination of the conditions of cooked, uncooked, frozen and non-frozen. The food components in the receptacle can be frozen before placing the cover on the receptacle or after placing the cover on the receptacle. Also a solid component can be on top of a liquid component. For example, in a package of "Moo Goo Gai Pan" (Chicken with mushroom and vegetables), the top layer can be a mixture of "chicken meat and gravy", the middle layer can be a "mixed vegetables" layer and the bottom layer can be a steamed rice layer. It should be noted that a separation of such vegetable component from the gravy component during cooking and during heating is essential for preserving the fresh taste of both.

What is claimed is:

1. A food package separating a food component A and a food component B of an entree during manufacturing and during heating, comprising:

a food receptacle having an edge which defines an opening to said food receptacle;

said food component A comprising a solid placed on a bottom of said food receptacle;

a removable thin partition layer with an outer edge, said thin partition layer placed on said food component A with the outer edge of said thin partition layer extended over the opening and over said edge of said food receptacle;

said food component B comprising a gravy placed on said thin partition layer within said food receptacle;

said partition layer includes a means to facilitate cutting of said layer to allow the food component B to mix with the food component A when the food components are ready to be mixed; and a cover placed over the opening, over said thin partition layer and over said edge of said food receptacle wherein said thin partition layer is firmly secured between said edge of said food receptacle and said cover such that said food component A and said food component B are completely separated by said thin partition layer.

2. The food package according to claim 1 wherein said food component A and said food component B are frozen.

3. The food package according to claim 1 further including a second partition layer placed on said food component B and between said food component B and said cover and a food component C placed on said second partition layer.

4. The food package according to claim 3 wherein the food package is frozen.

5. The food package according to claim 1 wherein said means is a "tear strip" to facilitate cutting of said thin partition layer.

6. A method of manufacturing a packaged frozen food product, comprising the steps of:

placing a food component A in a food receptacle having an edge which defines an opening to the food receptacle;

placing a thin partition layer on the food component A;

extending an outer edge of the thin partition layer over the opening and edge of the food receptacle;

placing a means on the partition layer to facilitate cutting of the layer to allow the food component B to mix with the food component A when the food components are ready to mixed;

placing a food component B on the thin partition layer;

placing a cover over the food component B, over the thin partition layer and over the edge of the food receptacle; and freezing the food component A and the food component B in the food receptacle to make said packaged frozen food product.

7. The method of manufacturing the packaged frozen food product according to claim 6 further including the step of freezing the food component A and the food component B prior to said step of placing the cover over the food component B.

8. The method of manufacturing the packaged frozen food product according to claim 6 further including the step of freezing the food component A and the food component B after said step of placing the cover over the food component B.

9. The method of manufacturing the packaged frozen food product according to claim 6 further including the steps of:

placing a second thin partition layer on the food component B;

placing a food component C on the second thin partition layer.

* * * * *